(No Model.) 5 Sheets—Sheet 1.
H. P. FEISTER.
GAS ENGINE FOR RAILWAY CARS.

No. 324,244. Patented Aug. 11, 1885.

(No Model.)

5 Sheets—Sheet 3.

H. P. FEISTER.
GAS ENGINE FOR RAILWAY CARS.

No. 324,244. Patented Aug. 11, 1885.

Attest:
L. J. Matts
W. W. Wade

Inventor
Henry P. Feister
By his atty.

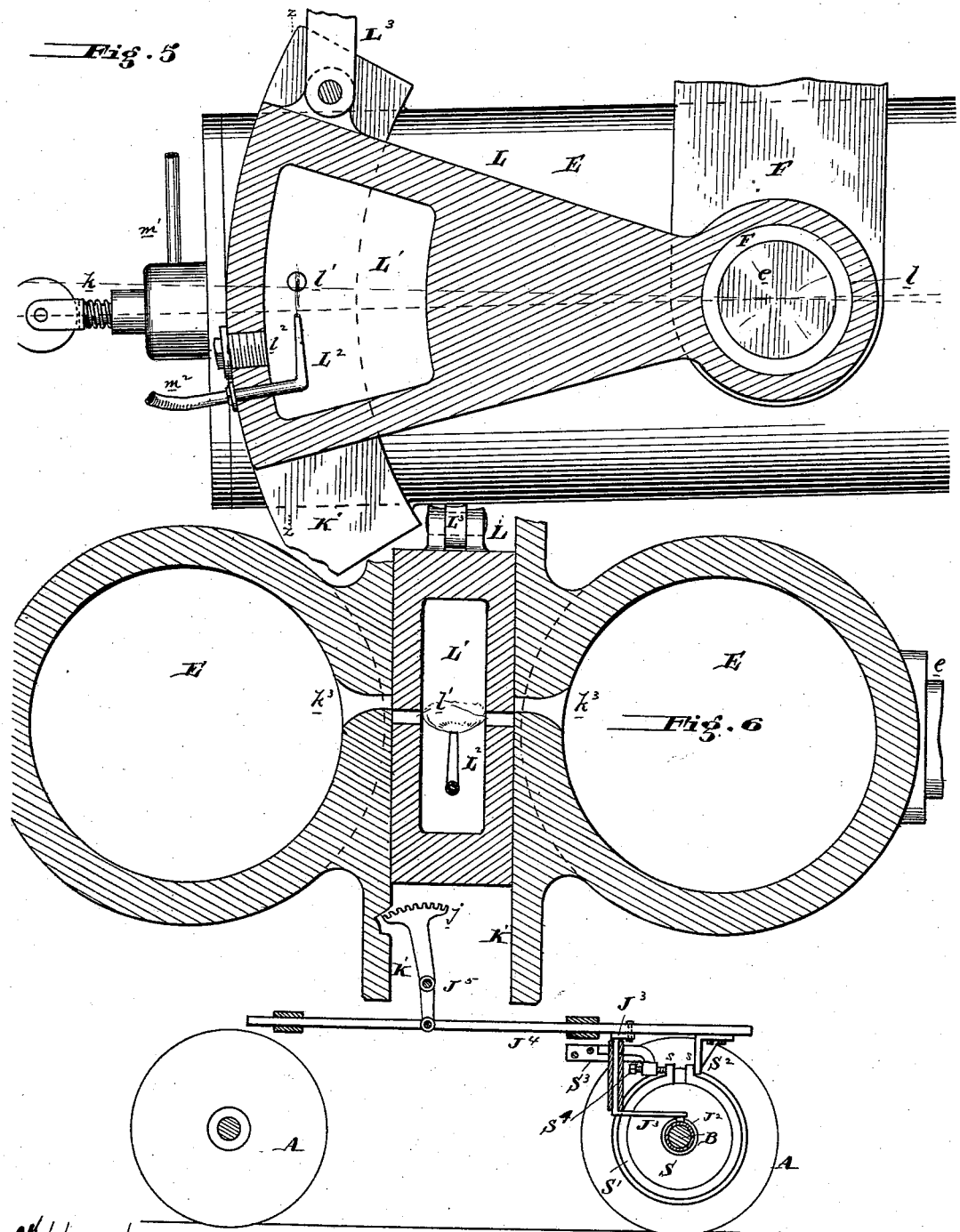

(No Model.) 5 Sheets—Sheet 5.
H. P. FEISTER.
GAS ENGINE FOR RAILWAY CARS.
No. 324,244. Patented Aug. 11, 1885.
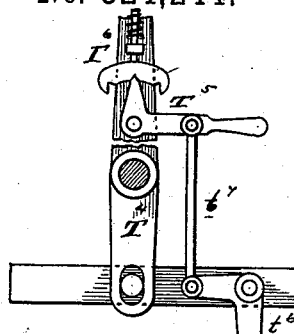
Fig. 8
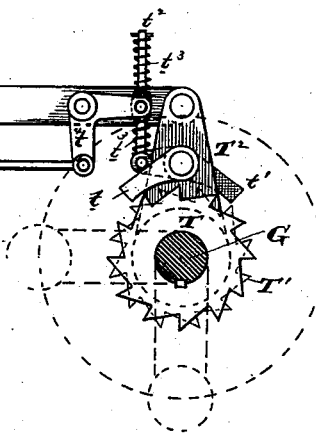
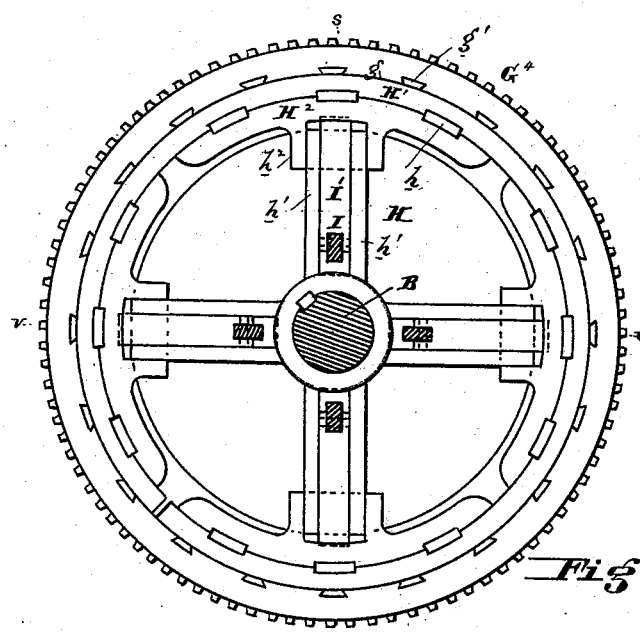
Fig. 9
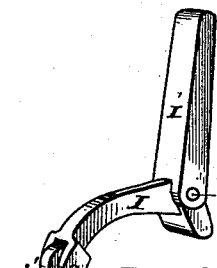
Fig. 11
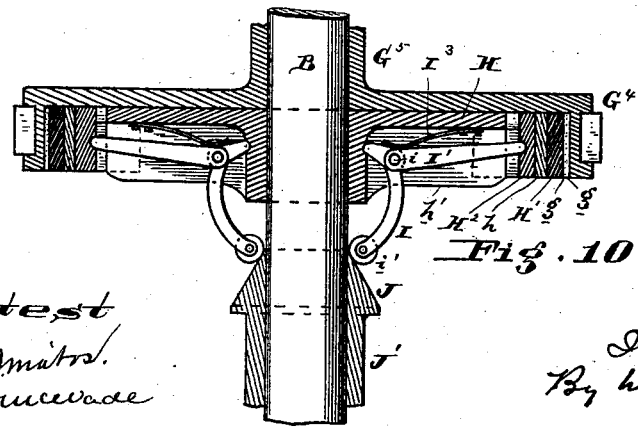
Fig. 10
Attest
L. J. Matos
Wm. Cevade
Inventor
Henry P. Feister
By his atty

UNITED STATES PATENT OFFICE.

HENRY P. FEISTER, OF PHILADELPHIA, PENNSYLVANIA.

GAS-ENGINE FOR RAILWAY-CARS.

SPECIFICATION forming part of Letters Patent No. 324,244, dated August 11, 1885.

Application filed January 5, 1884. (No model.)

*To all whom it may concern:*

Be it known that I, HENRY P. FEISTER, of the city of Philadelphia, county of Philadelphia, and State of Pennsylvania, have invented an Improvement in Gas-Engines for Railway-Cars, of which the following is a specification.

My invention has reference to tram-cars or motive power for railways in general; and it consists in certain improvements, all of which are fully set forth in the following specification, and shown in the accompanying drawings, which form part thereof.

The object of my invention is to utilize an explosive mixture or vapor—such as gas and air—as a motive power for street or tram cars, the said gas being carried in a compressed condition in reservoirs upon said cars.

Figure 1:
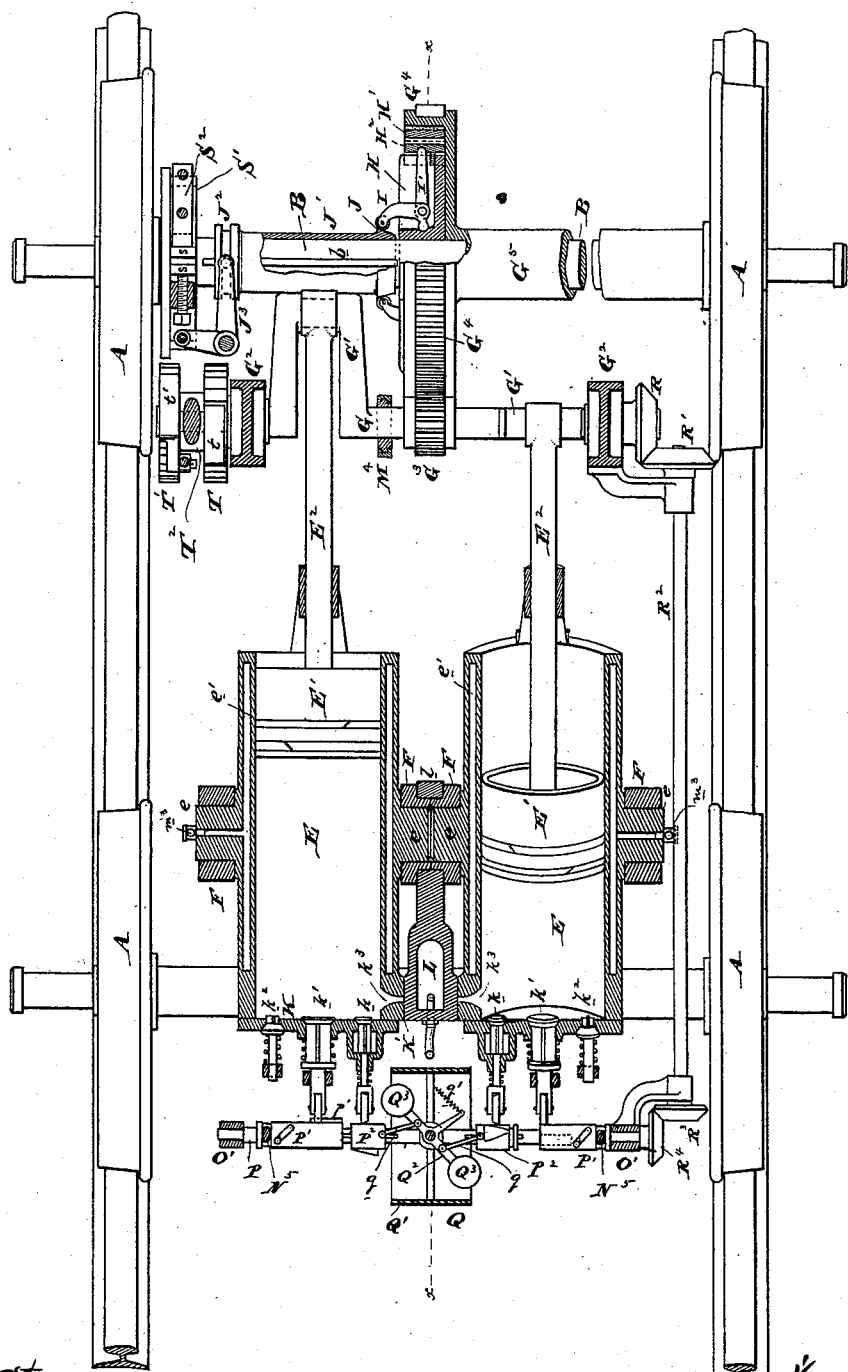
Figure 2:
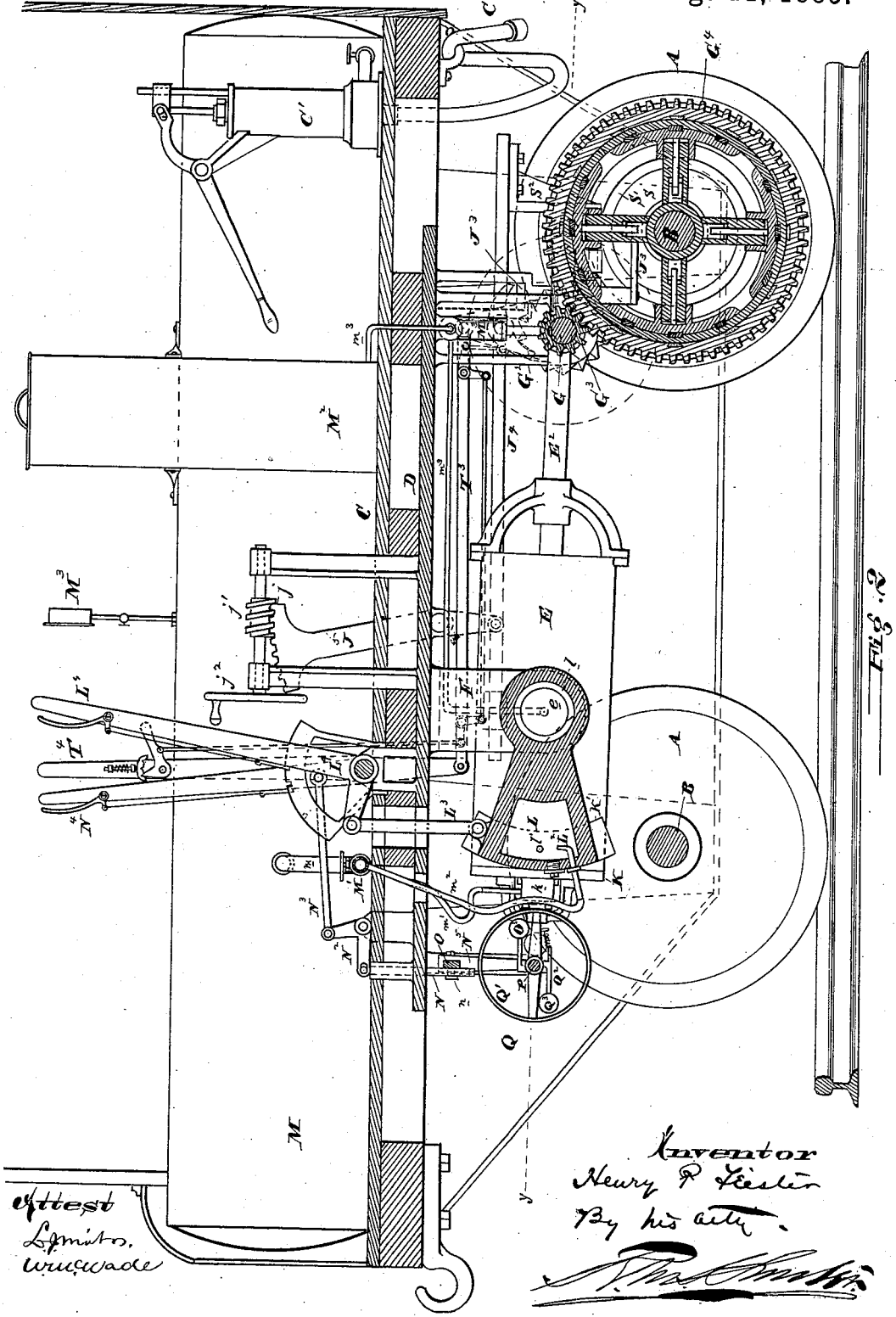
Figure 3:
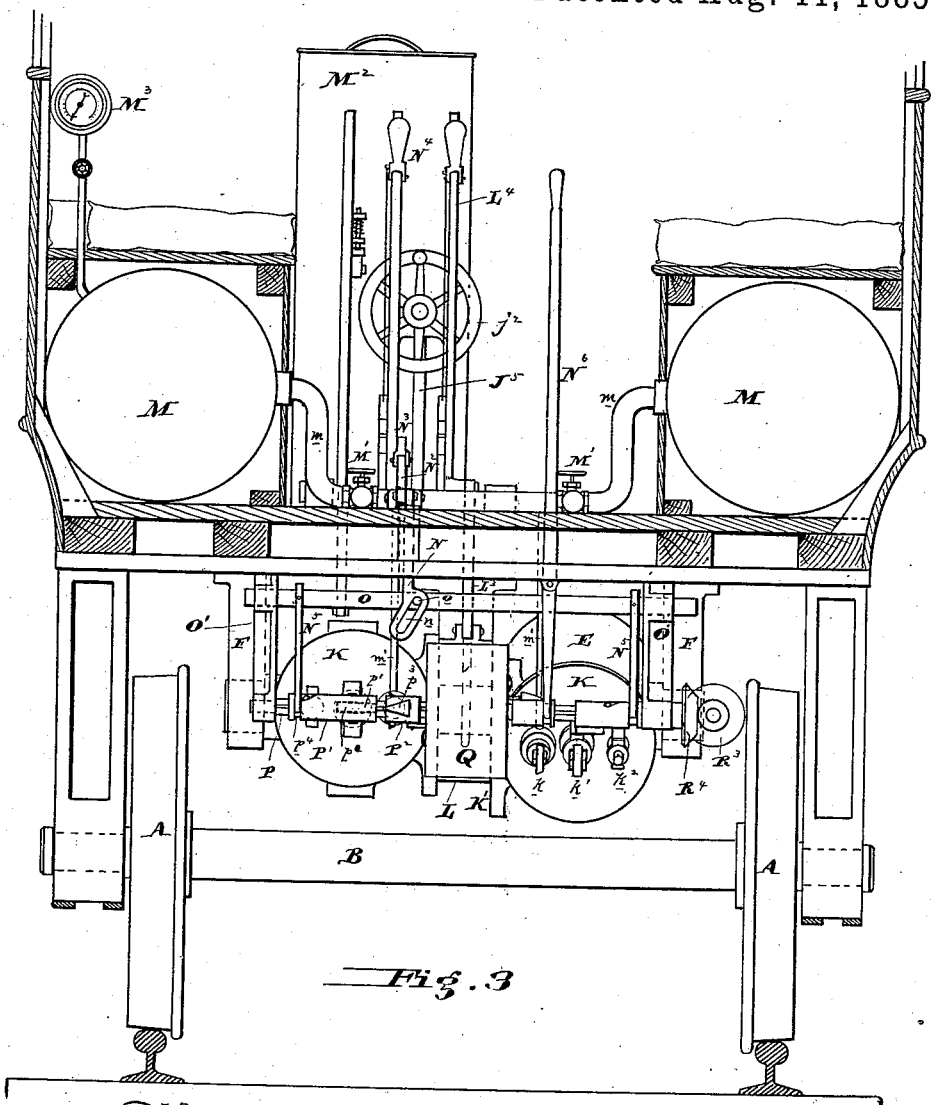
Figure 4:
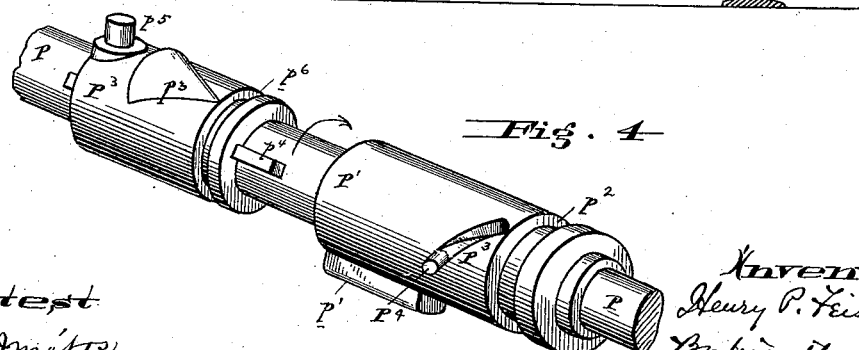

In the drawings, Figure 1 is a sectional plan view, taken on line $y\ y$ of Fig. 2, of a tram-car embodying my invention. Fig. 2 is a sectional elevation of same on line $x\ x$ of Fig. 1. Fig. 3 is a rear elevation of same with part of the cab or wood-work of the car broken away. Fig. 4 is a perspective view of one set of cams for operating the gas and exhaust valves of one cylinder. Fig. 5 is a sectional elevation of the reversing and gas igniting chamber, taken on line $x\ x$ of Fig. 1, and shows part of one of the cylinders in the act of having its gas exploded. Fig. 6 is a cross-section on line $z\ z$ of Fig. 5, and is designed to show how the exploding-chamber is situated between the two cylinders. Fig. 7 is a skeleton elevation showing the brake device. Fig. 8 is also a skeleton elevation, and shows the device for turning the crank-shaft to the desired position to enable the engine to start off at once without having first to move the car. Fig. 9 is an elevation of the large spur-wheel which meshes with the pinion on the engine-shaft, and also of the friction mechanism by which the said wheel is made fast or loose with the axle of the car. Fig. 10 is a cross-section of same on line $v\ v$, and Fig. 11 is a perspective view of the toggle-joint used in the friction mechanism shown in Figs. 9 and 10.

A are the car-wheels, and B their shafts. C is the body of the car. D is the bed-plate to which the motive power is attached, and is secured to the car frame or body C. E E are two cylinders arranged to oscillate upon trunnions $e$, which are adapted to work in bearings F. $e'$ are water-circulating spaces or jackets through which cold water is constantly circulated to prevent heating of the cylinders. E' are the pistons, and $E^2$ the piston-rods, which are connected on their ends with the cranks G' G', set at right angles to each other on shaft G, which is supported in bearings $G^2$ and has secured thereon the pinion $G^3$.

On the end of shaft G is a miter-gear R, which meshes with miter-gear R' on the end of shaft $R^2$, which drives the valve-cam shaft P through the agency of miter-gear $R^3$ $R^4$; hence the shaft P rotates at the same velocity, or synchronously with shaft G.

The rear ends of cylinders E are closed by heads K, which are, respectively, provided with three valves—viz., a gas and air inlet, $k$, and exhaust $k'$ which open inward, and a relief-valve, $k^2$, which opens outwardly. All of these valves are kept closed normally by suitable springs.

The shaft P is supported in bearings O', and is provided with feathers $p^4$. (See Fig. 4.) Sliding loosely upon said shaft and rotating therewith are two sets of cam-sleeves, one set being located in the rear of each cylinder.

The sleeves P' are provided with annular grooves $P^2$, oblique slots $P^3$, and a cam projection, $p'$. When the engine is running in one direction, the cam $p'$ in one position upon shaft P actuates the exhaust-valve $k'$, but when it is running in the other direction the sleeve P' is rotated a part of a revolution upon shaft P, and simultaneously shifted, so as to bring the cam $p'$ into a new position thereon, whereby it acts in the same relative manner upon the exhaust-valve. The revolution is imparted to said sleeve by the pin $P^4$, which is secured to the shaft P, working in the oblique slot $P^3$. These sleeves P' are reciprocated by arms $N^5$, secured to a bar, O, which is in turn reciprocated by a pin, $o$, thereon working in an oblique slot, $n$, in rod N, which rod is moved vertically by a bell-crank, $N^2$, rod $N^3$, and lever $N^4$.

The gas-inlet valves $k$ are operated by triangular or cone cam-pieces $p^3$, secured to the sleeves P², which have only a sliding motion on said shaft P, being prevented from independent rotation by feather $p^4$. These sleeves P² are provided with pins $p^5$, to which are pivoted links $q$, connecting with the lever $Q^2$ of the governor Q, which lever is provided on its ends with balls $Q^3$, and drawn in a direction to thrust the sleeves P² apart by a spring, $q'$. This governor is inclosed within a wheel, $Q'$, for protection. If the engine is running too fast, the sleeves P² are drawn together, and the cams do not open the gas-inlet valves $k$ so much nor keep them open so long, thus causing the engine to slow down. Any other form of governor or cam mechanism may be used to accomplish the same effect.

The end of one of said sleeves P² may be provided with an annular groove, $p^6$, in which a lever, $N^6$, works to shift them, to prevent the too wide opening of the gas-inlet valves $k$ in starting the engine, or to allow the engineer to control the admission of gas by opposing or assisting the action of the governor.

The rear ends of the cylinders E have valve-faces K' and a port, $k^3$, opening from them into the interior of the cylinders. Working between these faces K' is the exploding-chamber L', which is formed in the segment L, pivoted at $l$ on the bearings F. This chamber is provided with a gas-jet, $L^2$, a plug, $l^2$, by which to get at said jet for repairs, and two ports, $l'$ $l'$, one opening through the walls of the segment on each side and in line with the paths described by the ports $k^3$ of the cylinders E, as shown in Fig. 6. This segment L may be raised or lowered by a link, $L^3$, and bell-crank hand-lever $L^4$. If desired, the segment L may be raised and sleeves P' be shifted by the hand-lever, as both of these parts must be shifted in reversing the engine. When in the position shown in Fig. 5, the port $l'$ in the segment L is in line with the port $k^3$ in the left-hand cylinder. If the said segment be raised and the sleeves P' be shifted, then the gas in the cylinder is ignited when the rear end of the cylinder is above the horizontal line, thus causing the cranks to be rotated in an opposite direction, driving the vehicle or car backward.

The pinion $G^3$ on shaft G meshes with the spur-wheel $G^4$, secured to the sleeve $G^5$, which fits upon the shaft or axle B. The interior of this spur-wheel contains a friction or other gripping device, by which the said wheel $G^4$ and its sleeve are made fast to the said shaft B. The inner face, $g$, of said spur-wheel is provided with pieces or sections $g'$, of lignum-vitæ wood to increase the friction.

H' is a steel ring cut through at one place, and when not expanded fits loosely within the face $g$. This ring is supported upon sections $H^2$, and prevented from rotating upon said sections by keys $h$. These sections $H^2$ are supported by a disk, H, made fast to shaft B, and have radial flanges $h^2$, which fit the radial ribs $h'$ of said disk, and between said radial ribs are toggles, which consist of the levers I I', hinged together at $i$, the said toggles being arranged between the hub of the disk H and shoes or sections $H^2$, as shown in Fig. 10, and are adapted to expand the ring H'. One of the three arms in each of said toggles is provided with a roller on its end, which rests upon the cone J, secured to the sleeve J' upon said shaft B, and by which said toggle is operated in one direction, the springs $I^3$ operating them in the other direction. This sleeve and its cone are arranged to slide longitudinally upon said shaft, but are prevented from turning by a feather, $b$.

The sleeve J' is provided with an annular groove, $J^2$, in which one end of a bell-crank lever, $J^3$, works, the other end of said lever being connected to a reciprocating bar, $J^4$, (see Fig. 7,) which bar is actuated by a lever, $J^5$, having teeth $j$, into which the worm $j'$, rotated by hand-wheel $j^2$, works, as shown in Fig. 2. This reciprocating bar $J^4$ also actuates the brake mechanism, which may be applied to both axles B, or to only one, as shown.

S is a disk secured to the shaft B, and encircling said disk is a friction-band, S', having lugs $s\ s$ on its free ends.

$S^3$ is a stationary lug, through which an adjusting-screw, $S^4$, is passed to press against one of said lugs $s$.

$S^2$ is a finger or bracket secured to said reciprocating bar $J^4$, and is adapted to press against the opposite side of the other of said lugs $s$, as shown in Fig. 7. Referring to that figure, when the bar $J^4$ is moved to the left, the ring S' is tightened upon the disk and the brake applied simultaneously therewith, the sleeve J' is shifted, and the action of the toggles in gripping device relieved, thus allowing the engine to rotate the spur-wheel $G^4$ and its sleeve $G^5$. By this means two objects are attained—viz., quickly arresting the motion of the car and accomplishing that result without arresting the motion of the engine. This latter result is almost, if not absolutely, necessary in the use of a gas-engine as a motor for a tram-car, as it consumes too much time and requires too much manipulation to start the engine again every time the car has stopped.

To start the gas-engine when made single-acting, it becomes necessary in some instances to be able to rotate the crank-shaft G a given portion of a revolution, so as to bring the ports $k^3\ k^4$ in the proper position for ignition of the gaseous charge in the cylinders, and also insure there being a sufficient supply of gas in said cylinders to produce the required motive power upon being exploded. Therefore to enable said shaft G to be turned, I secure upon it the two ratchet-wheels T T', having their teeth pointing in opposite directions, as shown in Fig. 8, and between said wheels I loosely pivot an arm, $T^2$, carrying the pawls $t\ t'$, adapted to engage with said ratchet-wheels, the said pawls being secured to the same shaft, so that when one is in contact with its wheel the other is out, so that both may be clear of their wheels. This arm $T^2$ is oscillated by a bar, $T^3$, which in turn is reciprocated by a hand-lever, $T^4$. The pawls $t\ t'$ are thrown in or out of action by rods $t^2\ t^5\ t^7$, bell-cranks $t^6\ t^4$, carried by bar $T^3$, and lever $T^5$, pivoted to lever $T^4$.

$T^6$ is a spring-lock, which is adapted to lock lever $T^5$ in one of three positions. When the lever $T^5$ is in the position shown, both pawls are clear of the ratchet-wheels and the engine may be run. If the said lever is pressed up, then pawl $t$ comes into play and the engine-shaft may be turned one way, but if pressed down the pawl $t'$ will come into play and the shaft will be rotated in the other direction by oscillating the band-lever $T^4$.

To enable the pawls $t\ t'$ to rise in passing back over the teeth of the ratchet-wheels, I provide two springs, $t^3$, upon the rod $t^2$, and on each side of the end of bell-crank $t^4$, so that while any movement of said bell-crank will govern which of said pawls shall be thrown into action the springs will allow either of them to have a spring action.

M M are the explosive-gas reservoirs, into which the gas is forced under pressure, and which pressure is indicated by a gage, $M^3$, to enable the engineer to know the condition of the charge in the said reservoirs and to decide whether or not to take a fresh supply from a street-main by the hand force-pump $C'$ and flexible tube $C^2$, or control the use of the gas as much as possible to enable the terminal station to be reached before renewing the contents of said reservoirs. These reservoirs are connected by a pipe, $m$, provided with valves $M'$, to control the pressure of gas admitted to the flexible supply-pipes $m'$ and $m^2$, leading to the cylinders and exploding-chamber.

$M^2$ is the cold-water reservoir, and $M^3$ is a pump worked by an eccentric, $M^4$, on shaft G, by which cold water is slowly circulated through the cylinder-jackets by pipes $m^3$.

While I have described the gas engine or motor as single-acting, it may be double-acting, if desired, and is so in a certain sense, as after the explosion and exhaust a partial vacuum is produced, and thereby allows the return of the piston to exert a certain force, as it does in gas-engines as commonly constructed.

I do not limit myself in any wise to the various specific constructions of mechanism set forth, as they are given as one instance, my invention comprehending the adaptation of gas as a motive power for tram-cars and vehicles generally, and mechanism broadly, to control and regulate its application.

The operation is as follows: The shaft G is first brought to the proper position by lever $T^4$, it having been disconnected from the car-shaft by means of the clutch, and after adjustment of the engine shaft and cranks the clutch is actuated to connect the car-shaft with the engine through the mediation of the gear-wheels, and the engine is then put in motion, revolving the spur-wheel $G^4$ and its sleeve. To start the car the wheel $j^2$ is turned to throw off the brake and cause the toggle to press the ring $H'$ out against the inner face, $g$, of the spur-wheel, and thus connect the said wheel to the axle B of the drive-wheels A. After once starting, the engine never stops until the destination of the car is reached, but by the use of the band-wheel $j^2$ the car may be brought to rest as often as desired. If it is desired to reverse the movement of the car, the levers $L^4$ and $N^4$ are moved, thus changing the position of the exploding-chamber and exhaust-cams to enable the contents of the cylinder to be exploded when the crank is a little above the dead-center instead of a little below it, as before, and also to enable the exhaust to take place at the same relative time, or after the piston has accomplished a certain distance of its stroke. When the car is stopped, the load is thrown off the engine, and its speed will be proportionally increased, but the governor Q cuts off the supply of gas to a minimum, and thereby keeps its speed normal.

In this application I do not claim the construction of a gas-motor, except so far as it is combined with a movable vehicle carrying it, and the controlling devices, as the claims on the motor, *per se*, will form subject-matter of another patent.

Having now described my invention, what I claim as new, and desire to secure by Letters Patent, is—

1. In a tram vehicle or car, a reservoir to contain and carry an explosive mixture or gas under pressure, and a gas engine or motor, in combination with pinion $G^3$, spur-wheel $G^4$, provided with an inner smooth face having wooden pieces $g'$, split ring $H'$, shoes $H^2$, keys K, toggles I I', sleeve J', having cone-face J, and axle B, to which said toggles are secured, substantially as and for the purpose specified.

2. A vehicle or car provided with a reservoir to contain and carry an explosive mixture or gas under pressure, a gas-engine or motor, brake mechanism to connect or disconnect said engine with the axle of said car, and simultaneously, or thereabout, remove or apply said brakes, substantially as and for the purpose specified.

3. A car or vehicle provided with a reservoir or receptacle to contain an explosive gas or vapor, a gas engine or motor, devices to connect or disconnect said engine with the axle of the car, and mechanism to adjust the position of the engine-crank without moving the car, substantially as and for the purpose specified.

4. A car or vehicle provided with a reservoir or receptacle to contain an explosive gas or vapor, a gas engine or motor, brake mechanism, devices to connect or disconnect said engine with the axle of the car and operate said brakes, and mechanism to adjust the position of the engine-crank without moving the car, substantially as and for the purpose specified.

5. A car or vehicle provided with a reservoir to contain an explosive gas or vapor, a gas engine or motor to propel the said car, devices to connect or disconnect said engine with the axle of the car, mechanism to adjust the position of the engine crank without moving the car, and means to reverse the motion of said engine, substantially as and for the purpose specified.

6. A car or vehicle provided with one or more reservoirs to contain an explosive gas or vapor, a two-cylindered gas engine or motor adapted to propel said car, and a governor arranged between the valve mechanism of the two cylinders and acting upon both simultaneously to control the flow of gas in its passage from the reservoir to the engine-cylinders, substantially as and for the purpose specified.

7. A car or vehicle provided with one or more reservoirs to contain an explosive gas or vapor, a two-cylindered gas engine or motor adapted to propel said car, and a governor arranged between the valve mechanism of the two cylinders and acting upon both simultaneously, and mechanism operated by hand to oppose or assist the action of the said governor, as desired, substantially as and for the purpose specified.

In testimony of which invention I hereunto set my hand.

HENRY P. FEISTER.

Witnesses:
R. M. HUNTER,
FRANCIS S. BROWN.